United States Patent [19]

Meisenheimer, Jr.

[11] 4,295,484
[45] Oct. 20, 1981

[54] FRANGIBLE CONNECTOR FOR SELF-CLOSING BREAKAWAY VALVE ASSEMBLIES OR SIMILAR STRUCTURES

[76] Inventor: Daniel T. Meisenheimer, Jr., 404 Longmeadow Rd., Orange, Conn. 06477

[21] Appl. No.: 181,386

[22] Filed: Aug. 22, 1980

[51] Int. Cl.³ .............................................. F16K 17/40
[52] U.S. Cl. .................. 137/68 R; 137/315; 285/2
[58] Field of Search ...................... 137/68 R, 797, 315; 285/2, 3, 4

[56] References Cited
U.S. PATENT DOCUMENTS 4,232,697  11/1980  Meisenheimer .................. 137/68 R Primary Examiner—Harold W. Weakley
Attorney, Agent, or Firm—Cifelli, Frederick & Tully

[57] ABSTRACT

Self-closing breakaway valve assembly of the type having two housings, two rotatable valve members respectively mounted in the housings and spring biased to close, and trigger means holding the valve members open, incorporates a frangible connector frangibly connecting the housings at a desired angular orientation. The frangible connector comprises two clamping rings secured together by frangible screws, the clamping rings defining a peripheral channel which captures two threaded attachment sleeves, which in turn are threaded into the housings to join the housings together. One of the attachment sleeves has a radially outwardly extending flange for turning it during assembly of the housings, such that a desired angular orientation between the housings may be established and maintained during assembly. Axial pins extending from each housing to openings in the clamping ring are used to establish the desired angular orientation.

11 Claims, 7 Drawing Figures

FRANGIBLE CONNECTOR FOR SELF-CLOSING BREAKAWAY VALVE ASSEMBLIES OR SIMILAR STRUCTURES

BACKGROUND OF THE INVENTION

This invention relates to a frangible connector for joining through assembly and thereafter frangibly connecting the two valve body housings of a self-closing breakaway valve assembly or similar structure.

My U.S. Pat. No. 3,921,656 discloses self-closing breakaway valve assemblies of the type comprising two valve housings joined by a frangible connecting means, each valve housing having mounted therein a rotatable valve member which is spring biased to close. Trigger means in the form of spider members spanning the bores of the rotatable valve members and a trigger ball engaged between the spider members maintains the rotatable valve members open until separation of the housings. Upon separation of the housings, the trigger ball providing engagement between the spider memebers is released, and the rotatable valve members rotate to their closed positions.

In such a self-closing breakaway valve assembly, it is preferable that the spider members be aligned when the rotatable valve members are opened. This provides a smoother flow through the bore of the valve assembly, minimizing turbulence and pressure drops. This can be accomplished in the structure shown in the '656 patent, because the frangible connection is made through radially protruding flanges of the two valve housings, i.e. the valve housings are positioned with the spider members aligned and the frangible rivets, screws or the like are mounted through the radially protruding flanges. However, in many instances it is desirable to enclose the frangible elements within the valve housings to keep the outside diameter of the housings to a minimum and to avoid interference with radial flanges used to mount the housings to bulkheads in aircraft or the like.

In my application Ser. No. 900,329, filed Apr. 26, 1978, now U.S. Pat. No. 4,232,697, there is disclosed a frangible connector for connecting the two housings of self-closing breakaway valve assemblies or similar structures. The frangible connector incorporates a tension ring concentric with and closely receiving a moment arm ring, with tension mode frangible means such as shearable set screws or pins extending across the axially disposed tension ring-moment arm ring interface to frangibly secure the tension ring and moment arm ring together. A bending ring is positioned adjacent the moment arm ring, and the bending ring and moment arm ring are connected by bending mode frangible means such as screws or rivets. The tension ring is adapted for connection to one of the valve housings, such as by being provided with screw threads, and the bending ring is adapted for connection to the other of the housing members, also by screw threads. If the frangible connector is pre-assembled as a unit, alignment of the spider members must be achieved by careful positioning and close tolerances of the threads, so that the spider members end up aligned when the entire assembly is screwed together. Alternately, the frangible mode set screws can be received in slots permitting limited rotation of the two housings to align the spider members, whereafter the set screws are tightened down to secure the housings in the desired position. However, not all self-closing breakaway valve assemblies require the type of frangible connector described in patent application Ser. No. 900,329, and in particular the separate tension mode frangibility is not required in some applications.

Further, it is necessary for the trigger ball to release from both spider members for both rotatable valve members to close. If the ball fails to release from one of the spider members for any reason, the rotatable valve member would not close. Although this is a highly unlikely occurrence, the result of such a failure dictates that every precaution be taken against it, and any improvement in this area is desirable.

Accordingly, there is need for alternate frangible connectors for structures such as self-closing breakaway valve assemblies, and in particular, there is a need for a self-closing breakaway valve assembly incorporating a frangible connector which provides for alignment of spider members in the assembled unit as well as other improvements.

SUMMARY OF THE INVENTION

The invention herein relates to a frangible connector for connecting the two valve housings of a self-closing breakaway valve assembly or similar structure, and more particularly, to a frangible connector which permits the relative angular orientation of the valve housings to be selected during assembly. The frangible connector comprises two clamping rings which are secured together by frangible screws, frangible rivets or the like, which fail under load to permit the assembled valve housings to separate. The clamping rings each have radially extending opposed flanges defining a circumferential channel therebetween. The frangible connector further comprises an attachment sleeve and a flanged attachment sleeve. Both of the attachment sleeves have inturned flanges which are captured in the circumferential channel defined by the assembled clamping rings, whereby the attachment sleeves are held together but are free for rotation relative to each other and to the clamping rings. Both attachment sleeves have threaded portions for threaded connection with the respective valve housings to be connected by the frangible connector. The flanged attachment sleeve has a radially outwardly protruding flange, preferably having an outside diameter equal to that of the valve housing. In an alternative embodiment, a single clamping ring may be attached by frangible means directly to the non-flanged attachment sleeve, the clamping ring capturing the flanged attachment sleeve as described above.

To assemble the frangible connector and the valve housings, the non-flanged attachment sleeve, rotatably receiving and carrying one of the clamping rings, is threaded into a first one of the housings. The second clamping ring rotatably receiving and carrying the flanged attachment sleeve is attached to the first clamping ring via frangible screws. The second housing is then partially threaded onto the flanged attachment sleeve. The desired angular orientation between the first and second housings is established and held, and the flanged attachment ring is then rotated to draw the first and second housings together while maintaining the desired angular orientation. The flanged captured attachment ring slips with respect to the other attachment sleeve, the clamping rings and the first housing, and thereby draws the second housing into assembled relationship with the first housing without disturbing the desired angular orientation.

To achieve a precise angular orientation of the housings, each clamping ring is preferably provided with at least one and preferably two axially extending openings, and the housings are provided with pins extending axially toward the clamping rings. As each housing is threaded on to the frangible connector, the pins seat in the openings in the clamping ring. This achieves a precise pre-selected angular orientation between the housings. This feature is especially useful when connecting two housings of a self-closing breakaway valve assembly of the type having rotatable valve members held open by trigger means including spider members extending across the bores of the rotatable valve members (as shown in U.S. Pat. No. 3,921,656), wherein the alignment pins position the housings so that the spider members are aligned to minimize turbulence in flow through the flow passage.

Also according to the invention herein, where the trigger means includes a ball retained between the spider members, the portions of the housings adjacent to the paths of the spider members during closing action of the rotatable valve members is beveled to kick out the trigger ball from one of the spider members if the trigger ball should become lodged thereon.

Accordingly, it is a principal object of the invention herein to provide a frangible connector which is adapted for connecting the housings of self-closing breakaway valve assemblies or the like.

It is an additional object of the invention herein to provide a frangible connector which permits precise angular orientation of frangibly connected housings.

It is a further object of the invention herein to provide a frangible connector wherein the frangible elements are enclosed in the structure comprising the frangible connector and the connected housing members.

It is yet another object of the invention herein to provide positive kick out of the trigger ball in a self-closing breakaway assembly utilizing trigger means including spider members spanning the bores of rotatable valve members and a trigger ball interposed between the spider members to hold the rotatable valve members open until separation of the housings.

Other and more specific objects and features of the invention herein will in part be obvious and will in part appear from a perusal of the following description of the preferred embodiment and claims, taken together with the drawings.

DRAWINGS

The same reference numerals refer to the same elements throughout the various Figures.

DESCRIPTION OF PREFERRED EMBODIMENTS

With reference to the Figures, there is shown a self-closing breakaway valve assembly 100 incorporating a frangible connector 10, all according to the invention herein.

Figure 1:
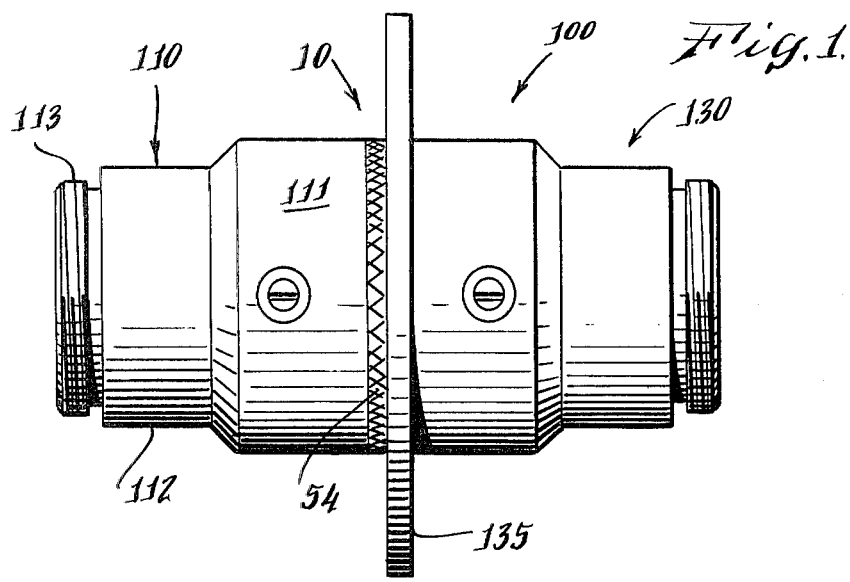
FIG. 1 is a side elevation view of a self-closing breakaway valve assembly incorporating a frangible connector according to the invention herein.
Figure 2:
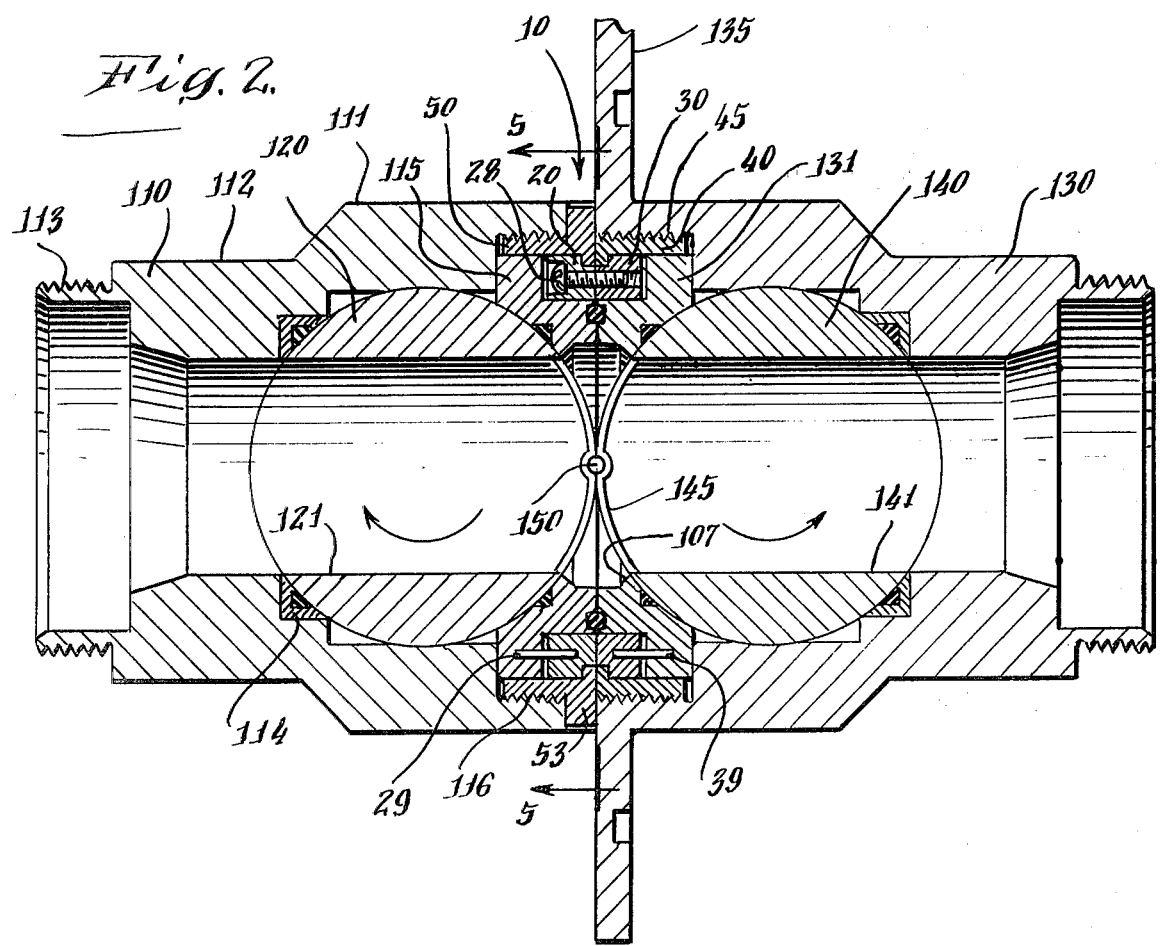
FIG. 2 is a longitudinal sectional view of the self-closing breakaway valve assembly of FIG. 1.
Figure 4:
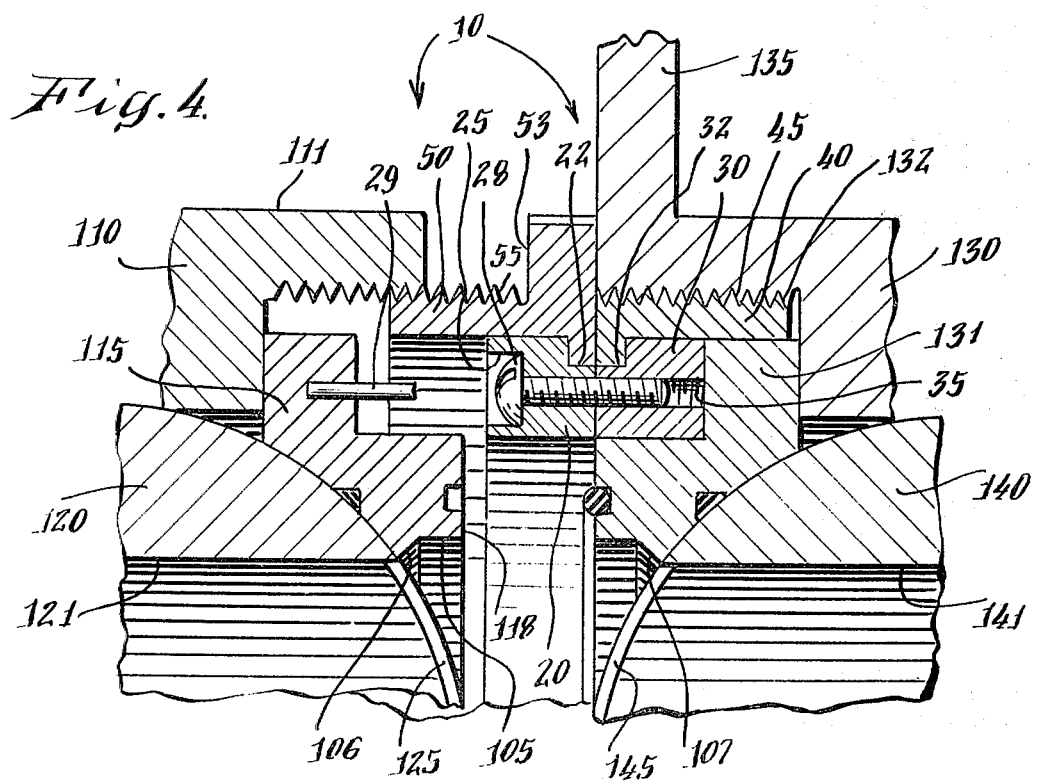
FIG. 4 is a fragmentary sectional view of the frangible connector being mounted to the housings of the self-closing breakaway valve assembly.

The self-closing breakaway valve assembly 100 is similar to the one described in my U.S. Pat. No. 3,921,656, incorporated herein by reference. Accordingly, the self-closing breakaway valve assembly generally comprises a first housing 110 having a first rotatable valve member 120 mounted therein, and a second housing 130 having a second rotatable valve member 140 mounted therein. The rotatable valve members define bores 121 and 141, respectively, and are held open by trigger means comprising spider members 125 and 145, respectively, having a trigger ball 150 captured therebetween. In the open position of FIG. 2, a flow of fuel is permitted through the aligned bores 121 and 141 of the rotatable valve members 120 and 140. The rotatable valve members are spring biased to close, and upon separation of the housings 110 and 130, the trigger ball 150 is released permitting the rotatable valve members to close, i.e. to rotate to misalign the bores 121 and 141 and thereby block the passages through the housings 110 and 130. The housing 100 is generally cylindrical, and more particularly has a cylindrical outer surface 111, a smaller diameter cylindrical outer surface 112, and a threaded cylindrical portion 113 adapting the housing for connection to a fuel line. A ball seat 114 is mounted behind the rotatable valve member 120 in the housing 110, and is provided with an O-seal against the rotatable valve member 120. Another ball seat member 115 is also mounted in the housing 110 adjacent the frangible connector 10 and the ball seat 115 is shaped to accept the frangible connector 10, as will be more fully discussed below. The housing 110 has threads 116 on an interior cylindrical surface for receiving the frangible connector 10, as will be more fully discussed below. As best seen in FIGS. 2 and 4, the end surface 118 of the ball seat 115 extends beyond the end surface 109 of the housing 110, also for receiving the frangible connector 10.

The other housing 130 is similar to the housing 110 described above, with one exception. The housing 130 is shown provided with a radially extending flange 135, which may be required to mount the assembled self-closing breakaway valve assembly 100. Of course, this flange is an optional structural element, depending upon the mounting requirements. In any event, the end surface 133 of housing 130 terminates in the same plane defined by the end surface 134 of ball seat 131, and threads 132 on the inside cylindrical surface extend to that plane.

The details of the pivotal mounting of the rotatable valve members 120 and 140, including the springs biasing the valve members toward their closed positions and stop means for stopping the rotatable valve member at their closed positions blocking flow through the housings, may be as described in my U.S. patent application Ser. No. 900,329, filed Apr. 26, 1978, also incorporated herein by reference.

The frangible connector 10 connects the two housings 110 and 130. Upon application of force to the housings, such as sometimes occurs in a crash of the aircraft or other vehicle in which the self-closing breakaway valve assembly is used, the frangible connector 10 separates, thereby also permitting the housings 110 and 130 to separate. This releases the engagement between the rotatable valve members 120 and 140, which pivot to their closed positions and block fuel flow. Since the separation occurs at a predeterminted point in preference to rupture of fuel lines, and since the valves close to prevent fuel loss, the danger of fire is greatly reduced.

Figure 3:
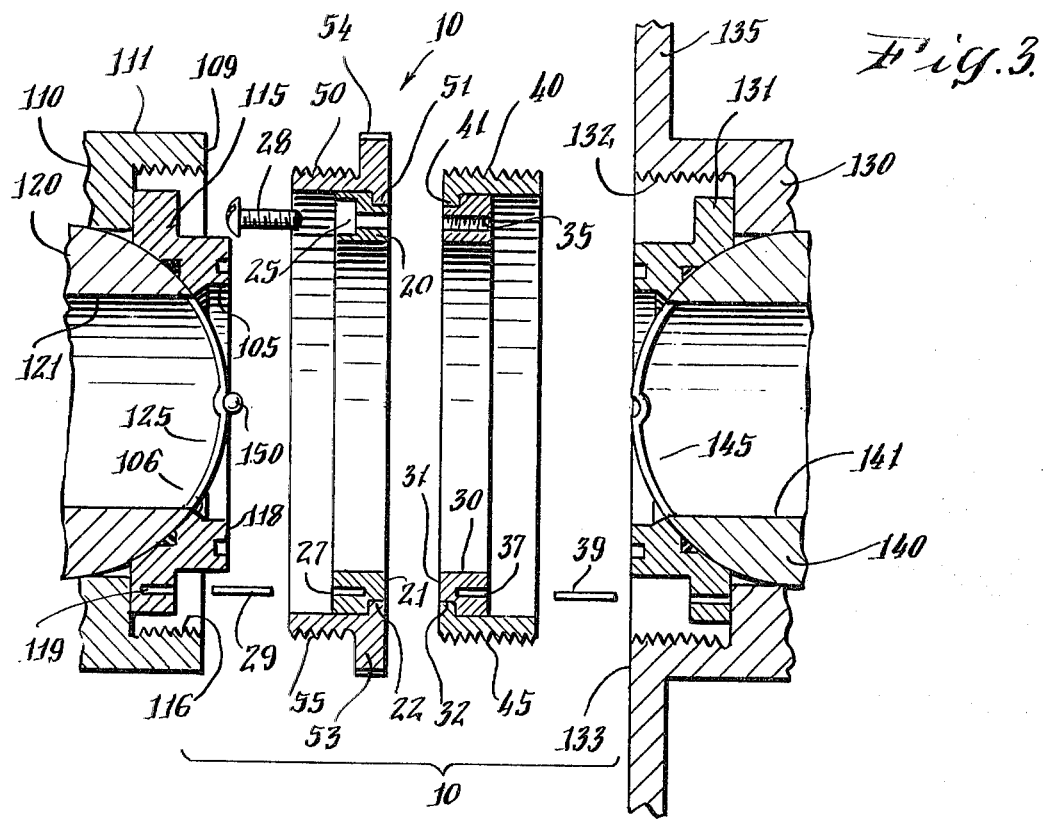
FIG. 3 is an exploded, fragmentary, sectional view of the frangible connector and a portion of the self-closing breakaway valve assembly of FIG. 1.

With reference to FIGS. 2 and 3, the frangible connector 10 generally comprises clamping rings 20 and 30, a captured attachment sleeve 40, a flanged captured attachment sleeve 50, and frangible screws 28 connecting the two clamping rings together. The clamping ring 20 is generally cylindrical and has a flat end surface 21 which butts against the flat facing surface 31 of the clamping ring 30 when the two clamping rings are assembled together. The outer surface of the clamping ring 20 is notched at 22, and the outer surface of the clamping ring 40 is similarly notched at 42, wherein the two clamping rings define an annular outwardly opening channel when they are assembled together. The captured attachment sleeve 40 is also generally cylindrical, and has an inturned flange 41 which is received in the notch 32 of the clamping ring 30. The exterior cylindrical surface of the captured attachment sleeve 40 is threaded, as indicated at 45. The flanged captured attachment sleeve 50 is also generally cylindrical and has an inwardly extending flange 51 which seats in the notch 22 of the clamping ring 20. The flanged captured attachment sleeve 50 also has an outwardly extending radial flange 53 which has an outer diameter approximately equal to that of the housing 110. The outer surface of the flange 53 may be knurled, as indicated at 54. The axial dimension of the flange 53 is the same as the distance the ball seat 115 extends beyond the housing 100, i.e. the flange 53 fills the gap between the end surface 109 and 133 of the housings when the ball seats 115 and 131 are in abutting relationship. The remaining exterior cylindrical surface of the flanged attachment sleeve 50 is threaded, as indicated at 55.

Figure 5:
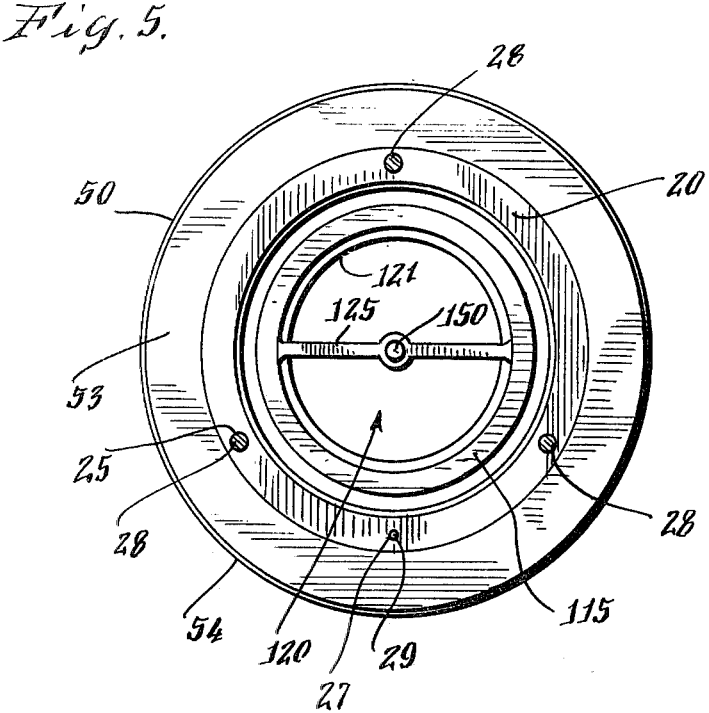
FIG. 5 is a sectional view of the frangible connector and self-closing breakaway valve assembly, taken along the lines 5—5 of FIG. 2.

The clamping ring 20 defines a plurality of openings 25 therethrough, seen in FIGS. 3 and 5, for receiving frangible screws 28 which hold the frangible connector together, and thereby also hold the housings 110 and 130 together. The openings 25 include enlarged portions for receiving the heads of the frangible screws 28. The clamping ring 30 also defines threaded openings 35 aligned with the openings 25, one of the openings 35 being seen in the sectional view of FIG. 3, into which the frangible screws 28 are threaded for securing the clamping rings 20 and 30 together.

When the frangible screws 28 are inserted through the openings 25 in the clamping ring 20 and threaded into the openings 35 in the clamping ring 30, thereby securing the clamping rings 20 and 30 together, the attachment sleeve 40 and the flanged attachment sleeve 50 are "captured" and "clamped" together by the clamping rings 20 and 30, as illustrated in FIGS. 2 and 4. The attachment sleeve 40 and the flanged attachment sleeve 50 are free to rotate relative to the clamping rings 20 and 30 and to each other as well. With reference to FIG. 5, in the embodiment illustrated the clamping rings 20 and 30 are held together by three frangible screws 28, which are deployed at 120° intervals. However, it will be appreciated that a larger number of frangible screws may be utilized in accordance with the frangibility requirements, and that the screws are not necessarily evenly deployed at spaced intervals if uneven frangibility is desired.

In the preferred embodiment, the clamping ring 20 is further provided with at least one axially extending opening 27, and the clamping ring 30 is provided with a similar axially extending opening 37. With reference to FIG. 5, one such opening 27 is provided in the embodiment shown; however, two diametrically opposed openings are preferable and the single opening configuration is shown primarily for convenience in providing the FIGS. 2 and 3 sectional views which show both the opening 27 and the frangible screws 28. The axial opening 27 is sized to receive a pin 29, which is further received in an axially extending opening 119 in the ball seat 115. Similarly, a pin 39 is received in the opening 37 of the clamping ring 30 and also in an axially extending opening 139 in the ball seat 131. As will be more fully explained below, the pins 29 and 39 serve to angularly orient the housings 110 and 130, and more particularly, serve to align the spider members 125 and 145 of the rotatable valve members.

With reference to FIG. 4, the assembling of the frangible connector 10 and the valve housings 110 and 130 is shown. First, the clamping ring 30 is fitted into the attachment sleeve 40 and the attachment sleeve 40 is threaded into the housing 130, the threads 45 on the exterior of the attachment sleeve 40 being received by the threads 132 of the housing 130. The ball seat 131 is configured to provide clearance for the attachment sleeve 40. Although not shown in the section of FIG. 4, but with reference to FIGS. 2 and 3, the pin 39 is received in the opening 139 of the ball seat 131 and 38 of the clamping ring 30, thereby establishing a preselected angular orientation of the clamping ring 30 with respect to the spider member 145 of the rotatable valve member 140. The clamping ring 20, having the flanged attachment sleeve 50 fitted thereover, is fastened to the clamping ring 30 by means of the frangible screws 28. This also angularly positions the clamping ring 20 with respect to the clamping ring 30. The housing 110 is then threaded on to the flanged attachment sleeve 50, as is illustrated in FIG. 4. When the pin 29, which is positioned in and extends from the opening 119 in the ball seat 115, reaches the clamping ring 20, it is received in the opening 27 thereof, e.g. the pin 29 is shown in the fragmentary view of FIG. 4 but the opening 27 is not seen, whereby the housing 110 would be rotated until the pin and opening are aligned. This orients the clamping ring 20 with the spider member 125 of the rotatable valve member 120. It will be appreciated that the openings 27 and 37 in the clamping rings 20 and 30, and the openings 119 and 139 in the ball seats 115 131, are positioned such that when the pins 29 and 39 are engaged in their respective openings the spider members 125 and 145 of the rotatable valve members 120 and 140 are aligned. Once the pin 29 secures the housing 110 against rotation with respect to the clamping ring 20, the attachment sleeve 50 is rotated by means of its radially protruding flange 53 to continue to thread the housing 110 thereon, drawing the housing 110 toward the housing 130 until the assembled condition shown in FIG. 2 is achieved. As the attachment sleeve 50 is rotated to accomplish the foregoing, it slides with respect to the clamping ring 20. The knurled outer surface 54 on the flange 53 of the attachment sleeve 50 is exposed in the assembled self-closing breakaway valve assembly 100, and is thus available to impart turning motion to the attachment sleeve 50 as the housing 110 is drawn towards it.

It will be appreciated that if the frangible connector 10 is utilized to assemble housings which do not require precise radial alignment, the pins 29 and 39 and their respective openings may be omitted. In either case, the frangible connector 10 provides a means of assembling the housings together while enclosing the frangible connecting screws within the assembled housing. This provides a clean exterior of the assembled unit, and also protects the frangible screws against possible accidental damage.

Figure 7:
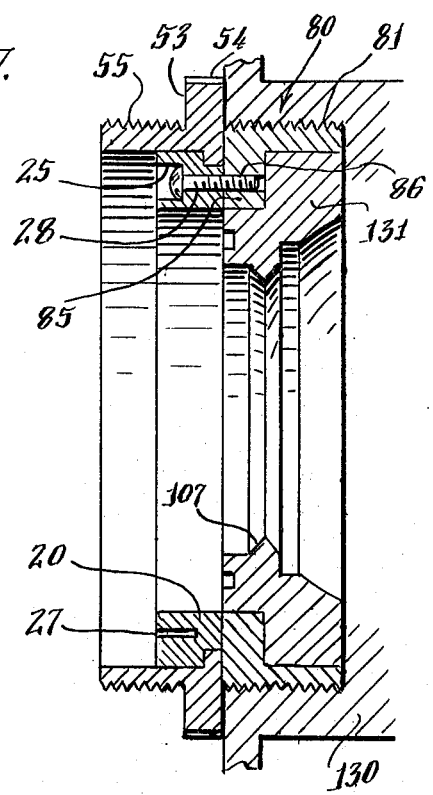
FIG. 7 is a sectional view of another frangible connector according to the invention herein.

With reference to FIG. 7, another frangible connector 70 according to the invention herein is illustrated. The frangible connector 70 comprises a generally cylindrical attachment sleeve 80 having threads 81 on its exterior surface, and an inturned flange 85. Clamping ring 20 is secured to the attachment sleeve 80, and more particularly, the inturned flange 85 of the attachment sleeve 80 defines threaded openings 86 aligned with the openings 25 in the clamping ring 20, whereby frangible screws 28 are threadably received in the openings 86 to secure the clamping ring 20 to the attachment sleeve 80. The frangible connector 70 further comprises the flanged attachment sleeve 50, the inturned flange 51 of the attachment sleeve 50 being received in the notch 22 of the clamping ring 20 whereby the attachment sleeve 50 is "captured" adjacent the attachment sleeve 80 and is free to rotate relative to the attachment sleeve 80 and clamping ring 20. The radially outwardly extending flange 53 provides means for imparting the rotational movement.

Although not illustrated, the frangible connector 70 is utilized to connect housings by first threading the attachment sleeve 80 into a first one of the housings. Then the second housing is threaded onto the attachment sleeve 50, and the attachment sleeve 50 is rotated via the flange 53 to draw the second housing into assembled relationship with the first housing while maintaining a desired angular orientation between the housings. It will be appreciated that the clamping ring 20 may define an axial extending opening receiving a pin extending from the housing being threaded onto the flanged attachment sleeve. The frangible connector 70 thereby also provides a smooth exterior in the assembled unit, and conceals and shields the frangible screws.

Upon application of loads to the self-closing breakaway valve assembly, such as a load which "bends" the housings relative to each other, the frangible screws 28 give way and permit the frangible connector 10 and the housings 110 and 130 to separate. This releases the engagement between the spider members 125 and 145, permitting the valve members 120 and 140 to rotate toward their closed positions. If the trigger ball 150 for any reason does not release from one of the spider members, the protruding trigger ball would prevent the associated valve member from closing.

In the self-closing breakaway valve assembly 110, the inner surface of the ball seat 115 defines a portion of the bore therethrough. More particularly, the ball seat 115 defines a cylindrical bore surface 105 of larger diameter than the bores 121 and 141 through the rotatable valve members 120 and 140, and further defines a beveled surface 106 which extends between the larger diameter cylindrical bore surface 105 and the bore 121 of rotatable valve member 120 when the valve member 120 is in its open position. A similar beveled surface 107 joins bore 105 with the bore 141 of rotatable valve member 100.

Figure 6:
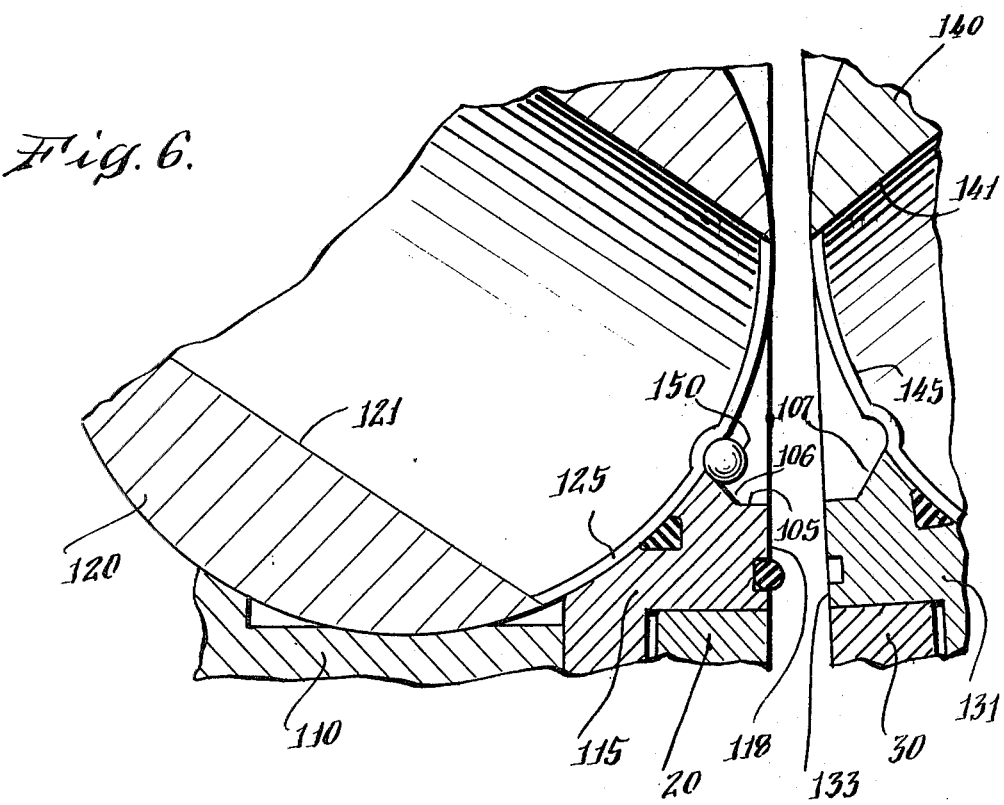
FIG. 6 is an exploded fragmentary view of a rotatable valve member of the self-closing breakaway valve assembly according to the invention herein showing the positive kick out of the trigger ball during closing action thereof.

The beveled surfaces 106 and 107 not only provide a transition between the two diameters of the bore, but also act as a positive kick out for the trigger ball 150 in the event that the trigger ball 150 becomes lodged in one of the spider members so as to potentially interfere with the proper closing action of the rotatable valve member 120. With reference to FIG. 6, the rotatable valve member 120 is shown moving to its closed position with the trigger ball 150 still seated against the spider member 125. As the rotatable valve member 120 closes, the trigger ball 150 impinges upon the beveled surface 106, which kicks the trigger ball 150 off of the spider member 125. To ensure positive action in this regard, the beveled surface 106 is preferably acutely angled away from a line passing through the center of the bore of the rotatable valve member 120 and the trigger ball 150, whereby the beveled surface 106 "lifts" the trigger ball off the spider member. It will be appreciated that it is highly unlikely that a trigger ball will be embedded upon a spider member, but should this occur, the beveled surface 106 provides a desired positive kickout action with respect to the trigger ball 150, thereby ensuring that the valve member will close.

Accordingly, there have been described self-closing breakaway valve assemblies and frangible connectors therefor or for other similar structures which admirably achieve the objects of the invention herein. It will be appreciated that various changes may be made from the preferred embodiments described above without departing from the spirit and scope of the invention, which is limited only by the following claims.

I claim:

1. A frangible connector for frangibly connecting the first and second housings of a self-closing breakaway valve assembly or the like, the frangible connector comprising:
   (A) a first clamping ring and a second clamping ring secured together by frangible means, the first and second clamping rings together defining a radially outwardly opening peripheral channel;
   (B) A first attachment sleeve received over the first clamping ring and having an inturned flange received in the radially outwardly opening peripheral channel, the first attachment sleeve being adapted for attachment to the first housing of the self-closing breakaway valve assembly; and
   (C) a second flanged attachment sleeve received over the second clamping ring and having an inturned flange received in the radially outwardly opening peripheral channel and a radially outwardly protruding flange, whereby the flanged attachment sleeve is free for rotation relative to the clamping rings and the first attachment sleeve, the flanged attachment sleeve being threaded for attachment to the second housing of the self-closing breakaway assembly;

whereby the clamping rings capture and clamp the attachment sleeves together and the flanged attachment sleeve may be rotated by means of its radially protruding flange to thread it into the second housing of the self-closing breakaway valve assembly, thereby drawing the second housing into assembled relationship with the first housing without rotating the first housing so that a desired angular orientation between the first and second housings may be established.

2. A frangible connector as defined in claim 1 wherein the frangible means connecting the first and second clamping rings are a plurality of frangible screws.

3. A frangible connector as defined in claim 1 wherein the means for attaching the first attachment sleeve to the first housing of the self-closing breakaway valve assembly comprises threads formed on the first attachment sleeve.

4. A frangible connector as defined in claim 1 wherein the first clamping ring defines at least one axial opening receiving a pin extending from the first housing and the second clamping ring defines at least one axial opening receiving a pin extending from the second housing, the pins establishing a desired angular orientation between the housings and maintaining the desired angular orientation between the housings as the flanged attachment sleeve is rotated to draw the housings into assembled relationship.

5. A frangible connector for frangibly connecting the first and second housings of a self-closing breakaway valve assembly or the like, the frangible connector comprising:
 (A) a first attachment sleeve and means for attaching it to the first housing, said attachment sleeve having an inturned flange;
 (B) a clamping ring secured to the inturned flange attachment sleeve by frangible means, the clamping ring defining a radially outwardly opening peripheral channel adjacent the attachment sleeve;
 (C) a second flanged attachment sleeve received over the clamping ring and having an inturned flange received in the radially outwardly opening peripheral channel and a radially outwardly protruding flange, whereby the flanged attachment sleeve is free for rotation relative to the clamping ring and the first attachment sleeve, the flanged attachment sleeve being threaded for attachment to the second housing of the self-closing breakaway valve assembly whereby the clamping ring captures and clamps the flanged attachment sleeves to the first attachment sleeve and the flanged attachment sleeve may be rotated by means of its radially protruding flange to thread it into the second housing of the self-closing breakaway valve assembly, thereby drawing the second housing into assembled relationship with the first housing without rotating the first housing so that a desired angular orientation between the first and second housings may be established.

6. A frangible connector as defined in claim 1 wherein the attachment sleeve is threaded for attachment to the first housing.

7. A frangible connector as defined in claim 5 wherein the clamping ring defines at least one axial opening receiving a pin extending from the second housing, the pin thereby establishing a desired angular orientation between the first and second housings of the self-closing breakaway valve assembly as the flanged attachment sleeve is rotated to draw the housings into assembled relationship.

8. A self-closing breakaway valve assembly comprising:
 (A) a first housing having a first rotatable valve member rotatably mounted therein, said first housing and first rotatable valve member each having a bore formed therethrough, said bores being aligned when said first rotatable valve member is in an open position to provide a passage through said first housing, and said first rotatable valve member spring biased to rotate to a closed position wherein the bores of said first rotatable valve member and said first housing are misaligned to block the passage through said first housing;
 (B) a second housing having a second rotatable valve member rotatably mounted therein, said second housing and said second rotatable valve member each having a bore formed therethrough, said bores being aligned when said second rotatable valve member is in an open position to provide a passage through said second housing, and said second rotatable valve member spring biased to rotate to a closed position wherein the bores of said second rotatable valve member and said second housing are misaligned to block the passage through said second housing;
 (C) a frangible connector for frangibly connecting the first and second housings, the frangible connector comprising:
  (1) a first clamping ring and a second clamping ring secured together by frangible means, the first and second clamping rings together defining a radially outwardly opening peripheral channel,
  (2) a first attachment sleeve received over the first clamping ring and having an inturned flange received in the radially outwardly opening peripheral channel, the first attachment sleeve attached to the first housing, and
  (3) a second flanged attachment sleeve received over the second clamping ring and having an inturned flange received in the radially outwardly opening peripheral channel and a radially outwardly protruding flange, whereby the flanged attachment sleeve is free for rotation relative to the clamping rings and the first attachment sleeve, the flanged attachment sleeve being threaded for attachment to the second housing, whereby the clamping rings capture and clamp the attachment sleeves together and the flanged attachment sleeve may be rotated by means of its radially protruding flange to thread it into the second housing of the self-closing breakaway valve assembly, thereby drawing the second housing into assembled relationship with the first housing without rotating the first housing at a desired angular orientation between the first and second housings may be established;
 (D) trigger means engaged between said first and second rotatable valve members to hold them in their open positions, wherein separation of said first and second valve housings upon fracture of the frangible connecting means releases said trigger means engaged between said first and second rotatable valve members and permits said first and second rotatable valve members to rotate to their closed positions, the trigger means comprising
  (1) a first spider member spanning the bore of said first rotatable valve member;
  (2) a second spider member spanning the bore of said second rotatable valve member; and
  (3) a trigger member engaged between said first and second spider members, wherein the spider members are aligned at the desired angular orientation established by the frangible connector.

9. A self-closing breakaway valve assembly as defined in claim 8 wherein the first clamping ring defines at least one axial opening receiving a pin extending from the first housing and the second clamping ring defines at least one axial opening extending from the second housing, the openings and pins serving to establish the desired angular orientation between the first and second housings with the spider members aligned as the housings are drawn into assembled relationship.

10. A self-closing breakaway valve assembly as defined in claim 9 wherein each housing defines a beveled surface adjacent the path of the portion of the spider member of the rotatable valve member mounted therein which engages the trigger ball during closing action of the rotatable valve member, whereby the beveled surface provides a positive kick out removal of the trigger ball from the spider member if the trigger ball is retained thereon.

11. A self-closing breakaway valve assembly comprising:
(A) a first housing having a first rotatable valve member rotatably mounted therein, said first housing and first rotatable valve member each having a bore formed therethrough, said bores being aligned when said first rotatable valve member is in an open position to provide a passage through said first housing, and said first rotatable valve member spring biased to rotate to a closed position wherein the bores of said first rotatable valve member and said first housing are misaligned to block the passage through said first housing;
(B) a second housing having a second rotatable valve member rotatably mounted therein, said second housing and said second rotatable valve member each having a bore formed therethrough, said bores being aligned when said second rotatable valve member is in an open position to provide a passage through said second housing, and said second rotatable valve member spring biased to rotate to a closed position wherein the bores of said second rotatable valve member and said second housing are misaligned to block the passage through said second valve housing;
(C) frangible means connecting said first and second housings with the bores formed therethrough in alignment; and
(D) trigger means engaged between said first and second rotatable valve members to hold them in their open positions, wherein separation of said first and second valve housings upon fracture of the frangible connecting means releases said trigger means engaged between said first and second rotatable valve members and permits said first and second rotatable valve members to rotate to their closed positions, the trigger means comprising
(1) a first spider member spanning the bore of said first rotatable valve member;
(2) a second spider member spanning the bore of said second rotatable valve member; and
(3) a trigger member engaged between said first and second spider members wherein each housing defines a beveled surface adjacent the path of the portion of the spider member of the rotatable valve member mounted therein which engages the trigger ball during closing action of the rotatable valve member, whereby the beveled surface provides a positive kickout removal of the trigger ball from the spider member if the trigger ball is retained thereon.

* * * * *